United States Patent [19]
Van Vleet

[11] Patent Number: 5,419,576
[45] Date of Patent: May 30, 1995

[54] INTERCHANGEABLE BALL HITCH CONNECTOR

[76] Inventor: Robert D. Van Vleet, 405 12th St., Sidney, Nebr. 69162

[21] Appl. No.: 187,083
[22] Filed: Jan. 26, 1994
[51] Int. Cl.⁶ .......................... B60D 1/06; B60D 1/28
[52] U.S. Cl. ...................................... 280/507; 280/511
[58] Field of Search ........................ 280/504, 507, 511

[56] References Cited

U.S. PATENT DOCUMENTS

| | | | |
|---|---|---|---|
| 4,596,406 | 6/1986 | Van Vleet et al. | 280/511 |
| 4,938,496 | 7/1990 | Thomas et al. | 280/511 |
| 5,290,057 | 3/1994 | Pellerito | 280/507 |

*Primary Examiner*—Mitchell J. Hill
*Attorney, Agent, or Firm*—Greer, Burns & Crain, Ltd.

[57] ABSTRACT

A ball hitch connector apparatus adapted for use with a conventional ball hitch socket is provided. The ball hitch connector has a lower support base with an upwardly extending stub shaft portion. The connector also includes a generally spherical body with a bore upwardly extending adapted to receive the stub shaft portion of said support base. The spherical body and the stub shaft each have transverse bores that can be aligned to receive a slidable latch pin. A radially expandable retention ring is movably mounted in a groove in the transverse bore of the spherical body which selectively engages the latch pin to prevent withdrawal of the latch pin from the spherical body.

13 Claims, 3 Drawing Sheets

INTERCHANGEABLE BALL HITCH CONNECTOR

FIELD OF THE INVENTION

The present invention is related to tow hitch devices and more particularly to a ball hitch device having a quick, detachable, interchangeable ball hitch connector.

BACKGROUND OF THE INVENTION

A common device for towing trailers uses a ball which is mounted on the bumper or draw bar of a vehicle. The trailer has a socket adapted to fit over the ball thereby coupling the vehicle to the trailer. Typically, the socket portion is on the trailer tongue. Normally, the trailer provides an adjustable coupling as part of the tongue so that after the socket is slipped over the ball, the coupling is closed to secure the socket to the ball. The ball and socket coupling then allows movement of the trailer with respect to the vehicle as typically occurs during towing.

The size of these ball and socket connections are usually standardized and measured or specified in terms of trailer ball diameter. However, trailer ball diameters are not always the same size. For example, there can be a number of different diameters which an individual might be required to use for towing various trailers. Typical diameters of trailer balls are, for example, $1\frac{7}{8}$ inches, 2 inches, $2\frac{1}{4}$ inches, and 2 5/16 inches.

Often a user may leave a trailer ball on his bumper for a long period of time and forget the particular size and possibly be inconvenienced or stranded when a trailer needs to be towed which is of a size that doesn't fit the particular trailer ball. One solution which is inefficient, time consuming, and bothersome is to keep a large wrench in the trunk or other storage compartment of the vehicle and use the wrench to completely remove the trailer ball from the bumper so that the ball of the proper size may be installed on the bumper. This process may soil the user and/or clothes with rust, dirt, grease, and the like in order to change the ball in poor weather conditions such as snow or rain. In addition there may be times when the trailer ball assembly cannot be removed with a wrench without great effort because the thread and nut connection has become rusted and/or corroded and cannot be disassembled.

Accordingly, it is an object of the present invention to provide an improved towing hitch which includes an easily detachable and interchangeable ball connector for tow bars on towing vehicles.

It is also an object of the present invention to provide an improved ball hitch connector apparatus for towing vehicles, including a variety of different sized ball connectors that can be easily detached from the tow bar or bumper and replaced with a ball connector of another selected size.

It is a still further object of the present invention to provide an improved ball hitch connector that can be detached from the tow bar of a towing vehicle with the use of common tools usually available to the operator of a towing vehicle.

It is a further object of the present invention to provide an improved ball hitch connector which prevents the placement of the trailer socket about the ball hitch unless the ball, forming part of the ball hitch connector has been properly attached.

Another object of the present invention is to provide an improved ball hitch connector apparatus that includes a base which is more or less permanently mounted on the tow bar of a vehicle and a ball connector that is easily attached to and detached from the base wherein a latch mechanism for properly attaching the ball connector to the base is positioned inside the ball connector when the ball connector is attached so that the latch mechanism is not exposed or subject to damage or wear from external parts or forces.

SUMMARY OF THE INVENTION

Accordingly a ball hitch connector apparatus adapted for use with a conventional ball hitch socket is provided. The ball hitch connector has a lower support base with an upwardly extending stub shaft portion. A bore extends inwardly from an outer surface of the stub shaft. The connector also includes a generally spherical body with a bore extending upward from a bottom surface with the upward bore being adapted to receive the stub shaft portion of said support base. The spherical body also has a transverse bore extending inward from an outer surface of the spherical body so as to be in communication with the vertical bore. The transverse bore is positioned within the spherical body so that when the stub shaft portion is inserted into the vertical bore of the spherical body, the spherical body may rotated to angularly align the bore of the stub shaft portion and the transverse bore of the spherical body.

The connector also includes a latch pin configured to be slidably received in the bore of the stub shaft portion and the transverse bore of the spherical body to retain the spherical body on the stub shaft portion when the stub shaft portion is positioned on the spherical body. The latch pin is slidable between a locked position wherein the latch pin means is positioned in the bore of the stub shaft portion and the second bore of the spherical body and a released position wherein the latch pin means is removed from the bore of the stub shaft portion and extends beyond the outer surface of the spherical body. To retain at least a portion of the latch pin within the spherical body, the connector has a retention ring movably mounted in the spherical body which selectively engages the latch pin to prevent withdrawal of the latch pin from the spherical body.

DETAILED DESCRIPTION OF THE PREFERRED EMBODIMENT

Figure 1:
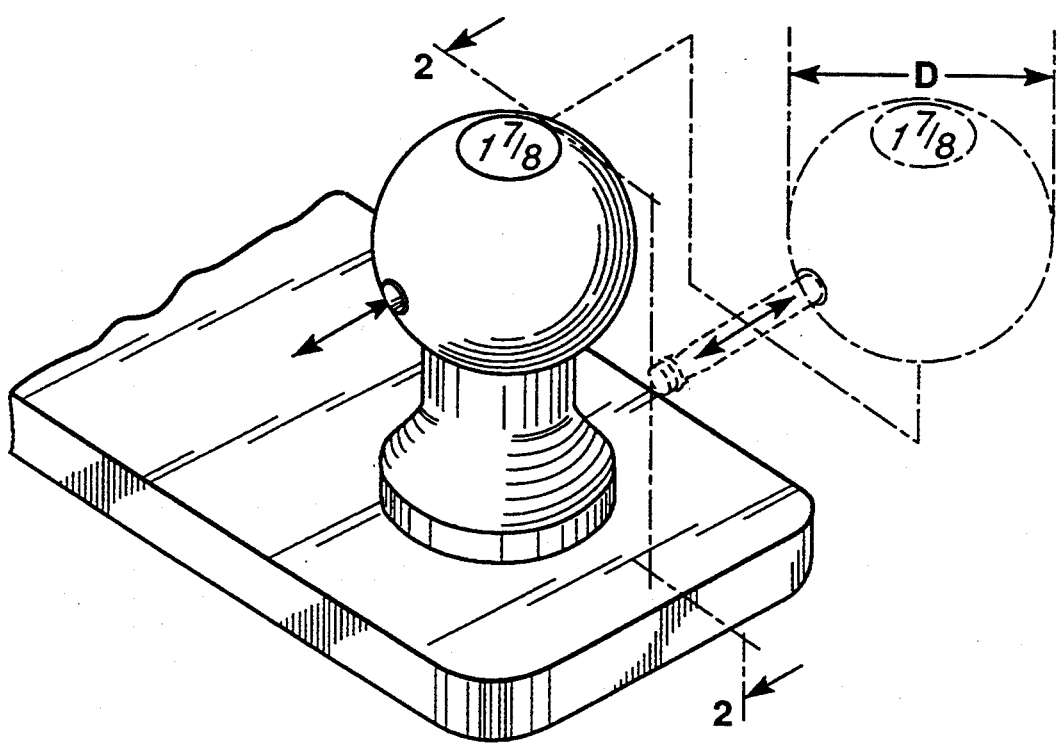
FIG. 1 is a perspective view of an embodiment of a ball hitch connector constructed in accordance with the present invention attached to the tow bar of a towing vehicle, a ball connector of the ball hitch connector being illustrated in phantom line as detached from the support base.
Figure 2:
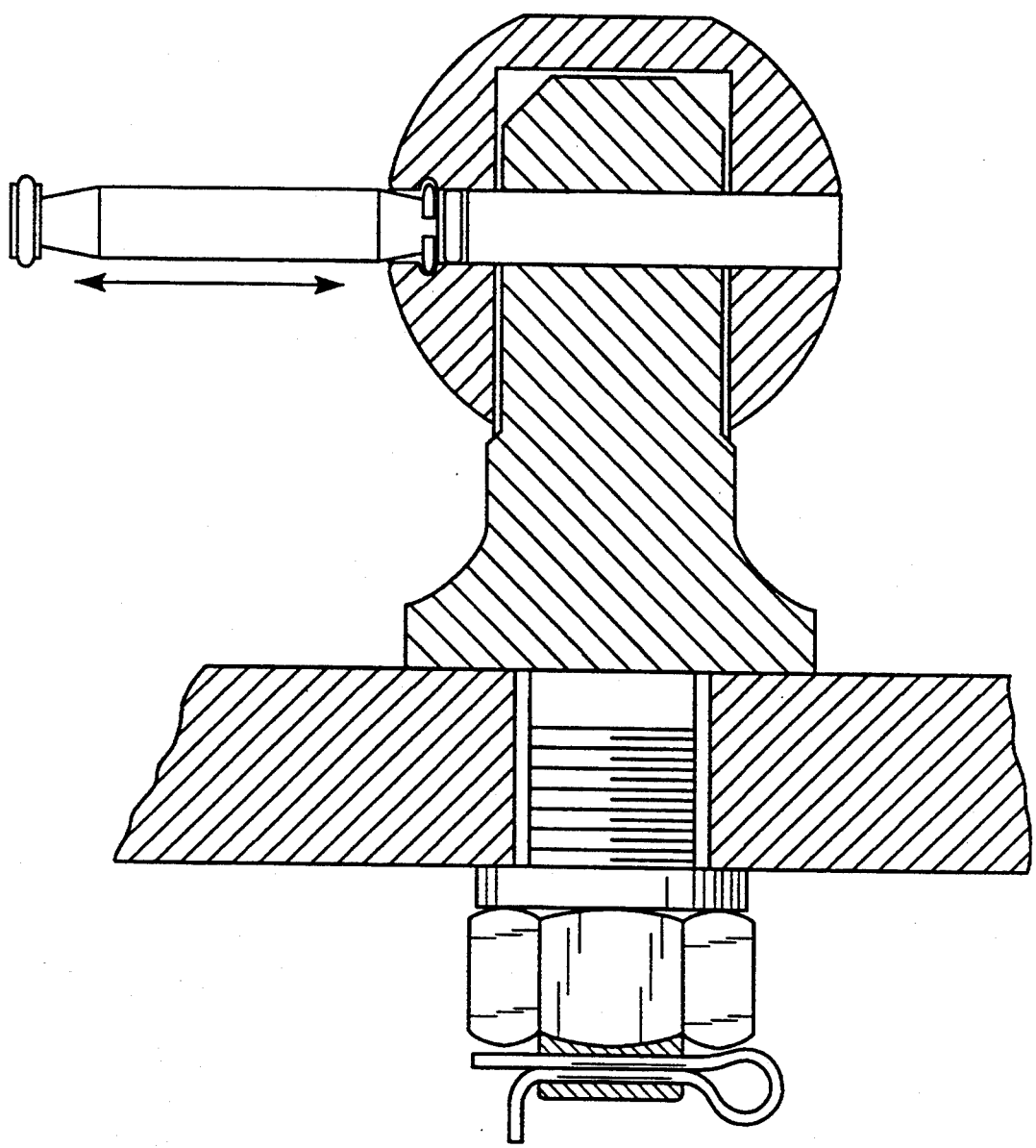
FIG. 2 is a cross-sectional view taken generally along line 2—2 in FIG. 1, illustrating a latch pin in the released position, the latch pin forming a part of the ball hitch connector of FIG. 1.
Figure 3:
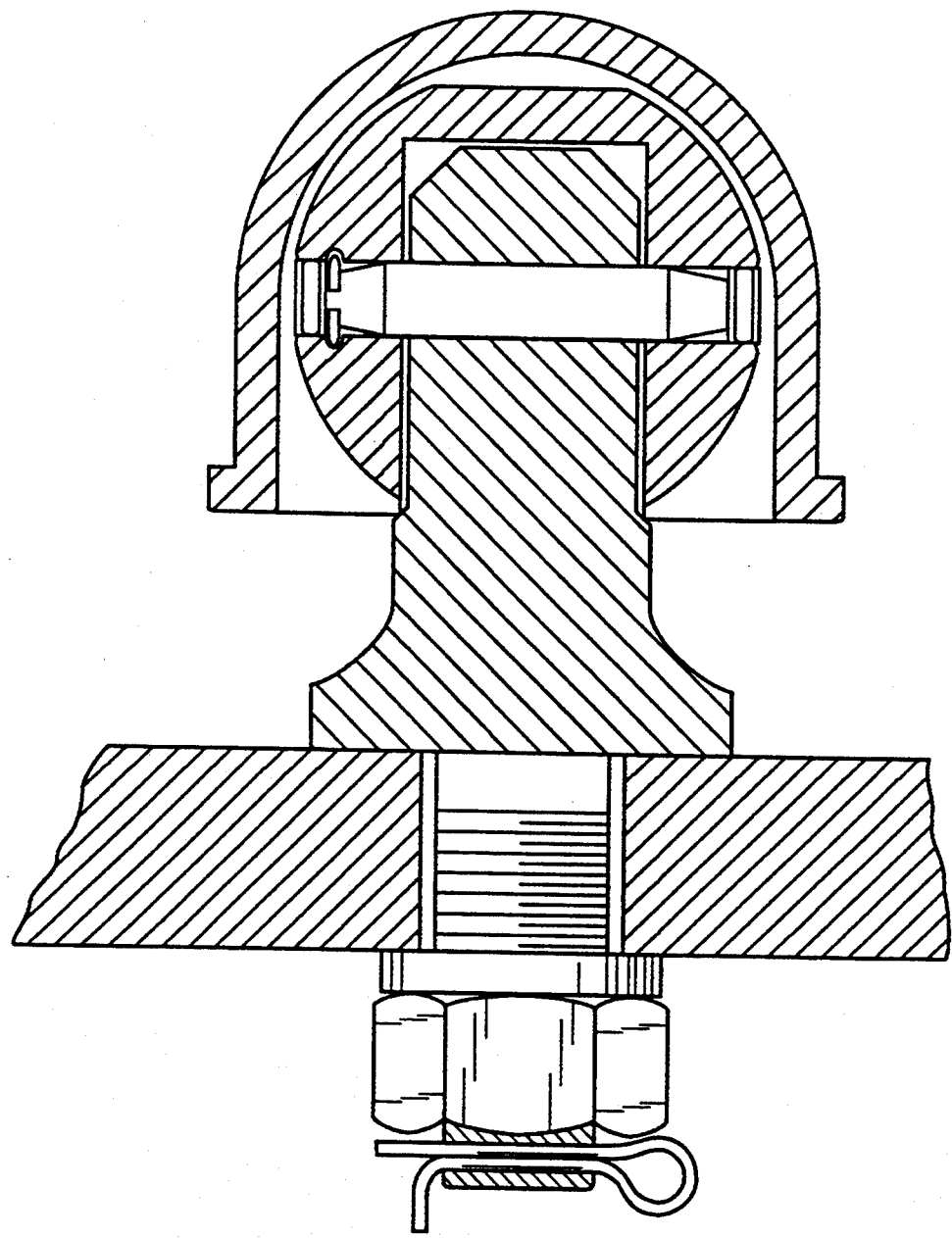
FIG. 3 is a view similar to FIG. 2 illustrating a ball hitch socket positioned over the ball connector with the latch pin in the locked position.

Referring now to the drawings, there is illustrated in FIGS. 1 through 3 an embodiment of a ball hitch connector 10 in accordance with the principles of the present invention. The ball hitch connector 10 includes four main components: a generally spherical body 12, also referred to as a ball connector, having an overall diameter D; a support base 14 for supporting the ball connector 12; a fastener device 16 for semi-permanently attaching the support base 14 to a tow bar 18 of a vehicle; and a releasable attachment mechanism 20 for releasably attaching the ball connector 12 to the support base 14. As illustrated in FIG. 3, the ball connector 12 is adapted for connection to a conventional ball hitch socket 22 mounted on the tongue or hitch (not shown) of a trailer or other vehicle to be towed.

The present invention enables interchanging of ball connectors having different diameters. In the preferred embodiment, the ball connector 12 may include a substantially flat top surface 24 with indicia thereon indicating the diameter of the ball connector 12. For example, in FIG. 1, the ball connector is illustrated as including indicia indicating the ball connector has a diameter of 1⅞ inches. It will be appreciated that numerous other methods might be utilized for indicating the diameter of the ball connectors. Moreover, such indication or indicia, while desirable, is not necessary to practice the present invention.

The support base 14 has a pedestal portion 26 extending upwardly from the tow bar 18 and an externally threaded stem portion 28 extending through and below a bore 30 in the tow bar 18. The pedestal portion 26 includes a large, flat bottom portion 32 and is tapered upwardly to form a narrower neck portion 34, and the pedestal portion terminates on top in an upright stub shaft portion 36. The stub shaft portion 36 is smaller in diameter than the upper portion of the neck portion 34, such that an annular collar 38 is formed around the base of the stub shaft portion 36. The stub shaft portion 36 has a substantially flat upper end surface 40 with beveled edges 42. In the preferred embodiment, the stub shaft portion 36 has a circular cross-section, so as to be substantially cylindrical in form.

The externally threaded stem portion 28 in the embodiment shown extends through and beyond the bore 30 in the tow bar 18 to enable attachment of the support base 14 to the tow bar 18 by use of an internally threaded nut 44 and lock washer 46 combination. Although the lock washer 46 will usually secure the nut 44 against being unscrewed, the preferred embodiment of the present invention includes a cotter pin 48 as additionally security to prevent the nut 44 from being unscrewed. Although a preferred embodiment is shown, it will be appreciated that numerous other methods of securing the support base 14 to the tow bar 18 might be utilized.

The stub shaft 36 is provided with a transversely extending cylindrical bore 50 extending completely through the stub shaft portion 36 from an outer surface on a first side of the stub shaft portion to an outer surface on a second, opposite side of the stub shaft. Moreover, the transverse bore 50 preferably is radially extending so as to pass through a longitudinal axis 52 of the stub shaft portion 36 and is preferably of substantially uniform diameter.

The spherical body or ball connector 12 is provided with a radial bore 54 extending upwardly from a bottom surface 56 of the ball connector for a distance which is preferably slightly less than the length of the stub shaft portion 36. Moreover, the radial bore is of a diameter sufficient to receive the stub shaft portion 36 therein and is preferably circular in cross-section so as to be cylindrical in form. The radial bore 54 preferably defines a substantially flat inner end surface 58 for cooperation with the substantially flat upper end surface 40 of the stub shaft portion 36.

The ball connector 12 is further provided with a transverse bore 60 extending completely through the ball connector 12 from an outer surface at a first side to an outer surface at an opposite, second side. The transverse bore 60 is preferably beveled at its ends 62 and extends into the radial bore 54 so as to be in communication therewith. Moreover, the transverse bore 50 preferably extends radially through the center of the ball connector 12 and is of the same general, cylindrical configuration as that of the transverse bore 50 of the stub shaft portion 36. In addition, the transverse bore 60 is positioned in the spherical body or ball connector 12 such that when the stub shaft portion 36 is inserted into the radial bore 54 of the ball connector 12, the transverse bore 60 of the ball connector can be made to line up with the transverse bore 50 of the stub portion 36 by rotation the ball connector 12 into the proper angular position.

Preferably, the substantially horizontally extending transverse bore 50 of the stub shaft portion 36 and the substantially horizontally extending transverse bore 60 of the ball connector 12 are vertically positioned such that when the flat inner surface 58 of the ball connector 12 is resting on the substantially flat upper end surface 40 of the stub shaft portion 36, the bores 50 and 60 are horizontally aligned, as generally illustrated in FIG. 2.

The ball connector 12 forms a ring seating groove 64 which extends about the transverse bore 60. The groove 64 preferably completely circumscribes the transverse bore 60 and extends outward from the transverse bore in a plane which is normal to the extension of the transverse bore.

Figure 4:
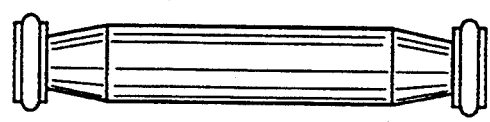
FIG. 4 is a side elevational view of the latch pin.

Referring to FIGS. 2 and 4, an elongated latch pin 70 is slidable disposed in transverse bore 60 of the ball connector 12. The latch pin 70 is radially symmetric about a longitudinal axis 72 and includes flanges 74 formed at the left end 70a and right end 70b of the latch pin 70. Each of the flanges 74 forms an O-ring groove 76 with an O-ring 78 mounted in the groove. The latch pin 70 includes a central metal cylindrical portion 80 which is sized to slide smoothly through the transverse bores 50 and 60. The latch pin 70 also includes two recessed, preferably frustoconical, portions 82 which connect the middle portions 78 to the end flange of 72. The frustoconical portions 82 are configured to neck down or reduce in diameter as the frustoconical portion 82 extends from the middle portion 80 to the end flange of 74. The frustoconical portions 82 cooperate with the two end flanges 74 to form shoulders 84.

Referring to FIGS. 2 and 3, a resilient, radially expandable ring 86, which is preferably shaped in the form of a "C", is radially movably disposed in the ring seating groove 64. The ring 86 is preferably made of a resilient metal such as a metal commonly used in springs. The ring 86 and groove 62 are sized and configured so that when one of the frustoconical portions 82 is disposed adjacent to the groove 62, the ring remains positioned in the groove 62, but a portion of the ring such as the top portion intrudes into the transverse bore 60 sufficiently to contactingly engage the shoulder 84 and prevent passage of either of the end flanges 72 past the groove 64. When a portion of the ring 86 intrudes into the transverse bore 60, the ring defines a relaxed state. The ring 86 and groove 64 are also sized so that when the ring is expanded radially outward, the ring is substantially accommodated within the groove 64 and does not prevent the middle cylindrical portion 80 of the latch pin 70 from passing by the groove 64. When the ring 86 is radially expanded into the groove the ring defines an expanded state.

As shown in FIG. 2, the retaining groove 64 and ring 86 are positioned along the transverse bore 60 at a location such that the latch pin 70 may be slidably moved to extend outwardly of the spherical body 12, and not project into the radial bore 54 of the spherical body 12. By not extending into the radial bore 54, the ring 86 does not interfere with the positioning of the spherical body 12 over the stub shaft portion 34. When the latch pin 70 is removed from the transverse bore 50 of the stub shaft portion 36 and radial bore 54 and extends beyond the outer surface of the spherical body 12, the latch pin defines a released position. In the released position, the right frustoconical portion of the latch pin is adjacent the groove 64 and a portion of the ring extends into the transverse bore 60 to contactingly engages the right shoulder 84 of the latch pin to prevent further outward movement of the latch pin.

As shown in FIG. 3, the ring 84 and groove 64 are also positioned along the transverse bore 60 at a location such that when the latch pin 70 is slidably moved to extend completely within the transverse bore 60 in the spherical body 12 and the transverse bore 50 in the stub shaft portion 34, the left frustoconical portion 82 of the latch pin is adjacent the groove 64 and a portion of the ring extends into the transverse bore 60 to contactingly engage the shoulder 84 to prevent further movement of the latch pin 70 into spherical body 12. When at least a portion of the latch pin 70 extends into the transverse bore 60 of the stub shaft 36 and the transverse bore of the spherical body 12, the latch pin defines a locked position. It is also preferred that when the latch pin 70 is in the locked position no portion of the latch pin extends outwardly of the spherical body 12 so that the hitch socket may be fitted about the spherical body.

Accordingly, the expandable ring 86 retains the latch pin 70 within the spherical body 12 even when the ball connector is removed from the stub shaft portion 34. The ring 86 also retains the latch pin 70 within the spherical body 12 when the latch pin 70 extends into the transverse bore 50. Thus, the latch pin 70 is retained at all times within the ball connector 12. Moreover, in the locked position, the ring 86 retains the latch pin 70 in a position whereby the end flanges 74 are flush with the sides of the ball connector 12.

In use, the ball connector 12 is positioned over the stub shaft portion 36 by inserting the stub shaft portion 36 into the radial bore 54 of the ball connector 12 so that the inner end surface 58 of the ball connector 12 rests on the substantially flat upper end surface 40 of the stub shaft portion 36. The connector 12 is then rotated to enable angular alignment of the transverse bore 50 in the stub shaft portion 36 with the transverse bore 60 of the ball connector 12. The latch pin 70 extends outwardly of the spherical body 12 with the right frustoconical portion 82 of the latch pin adjacent the ring seating groove 64. The ring 86 is in the relaxed state, but remains positioned in the ring seating groove 64 with a portion of the ring 86 extending into the transverse bore 60 to engage the right shoulder 84 of the latch pin 70. As the latch pin 70 is slidably moved into the transverse bore 50 of the stub shaft 36, the right frustoconical portion 82 of the latch pin 70 engages the expandable ring 86 about the circumference of the ring and radially expands the ring outward into the ring seating groove 64 until the ring is substantially and preferably completely accommodated within the seating groove 64. With the ring 86 substantially accommodated in the ring seating groove 64, the cylindrical portion 80 of the latch pin 70 is free to slidably move pass the ring seating groove 64.

The right end flanges 74 of the latch pin 70 is then slidably moved into and through the transverse bore 50 of the stub shaft portion 34 and into the portion of the transverse bore 60 on the opposite side of the ball connector 12. As the latch pin 70, is slidably moved such that the right end flange 74 passes into the transverse bore 60 on the opposite side of the ball connector 12, the left frustoconical portion 82 of the latch pin 60 moves adjacent to the ring seating groove 64. When the frustoconical portion 82 is adjacent the ring seating groove 64, the resilient nature of the ring 86 causes the ring to assume the relaxed state so that a portion of the ring 86 extends into the transverse bore 60. Further movement of the latch pin 70 to the right causes the ring 86 to contactingly engage the left shoulder 84 to prevent further rightward movement of the latch pin. In the preferred embodiment, the latch pin 70 is readily slidable such that the latch pin 70 can be slid by hand. If necessary, a small elongated utensil such as a key or the like, can be utilized to facilitate sliding of the latch pin 70.

As illustrated in FIG. 3, the ball hitch socket 22 is then positioned over the ball connector 12 and secured in place. The transverse bore 60 of the ball connector 12 is positioned such that the ball hitch socket 22 obstructs the end flanges 74 when the ball hitch socket 22 is positioned over the ball connector 12 thereby locking the latch pin 70 in place. Accordingly, it is impossible for the latch pin 70 to be slid to a released position once the ball hitch socket 22 is attached.

It will be appreciated that although the latch pin 70 of the preferred embodiment is illustrated as having a length substantially that of the ball connector 12, the length of the latch pin 70 of the embodiment shown must be at least sufficiently long to assure that when the ball hitch socket 22 is positioned over the ball connector 12, the latch pin 70 will be obstructed by the ball hitch socket 22 such that at least a portion of the latch pin 70 is positioned in the transverse bore 50 of the stub shaft portion 36. Moreover, as illustrated in FIG. 2, it is impossible to secure the ball hitch socket 22 to the ball connector 12 when the latch pin 70 is in a released position, since the latch pin 70 extends beyond the outer surface of the ball connector 12. The ball hitch socket 22 can only be secured to the ball connector 12 when the latch pin 70 is in a locked position, as illustrated in FIG. 3. This provides for a positive locking effect wherein the attachment mechanism 20 is either in a locked condition in a released condition.

Moreover, the retaining mechanism 20, an embodiment of which was previously described and is illustrated in FIGS. 2 and 4, insures that the latch pin 70 is retained with the ball connector 12. Not only does this prevent the latch pin 70 from becoming lost or disassociated with the ball connector 12, but more importantly it provides a substantial safety factor in that a trailer or other vehicle being towed cannot be hitched up to the ball hitch connector 10 of the present invention unless the latch pin 70 is an a locked position.

To remove the spherical body 12 from the stub shaft portion 36, the steps are reversed. If necessary, a small elongated tool such as a key or a screw driver can be utilized to facilitate sliding in the latch pin 70 to the left after the socket 22 has been removed from about the spherical body 12.

A specific embodiment of the novel interchangeable ball hitch connector according to the present invention has been described for the purposes of illustrating the manner in which the invention may be made and used. It should be understood that implementation of other variations and modifications of the invention in its various aspects will be apparent to those skilled in the art and that the invention is not limited by the specific embodiment described. It is therefore contemplated to cover by the present invention any and all modifications, variations, or equivalents that fall within the true spirit and scope of the basic underlying principles disclosed and claimed herein.

What is claimed:

1. A ball hitch connector apparatus adapted for use with a conventional ball hitch socket, comprising;
    a support base including an upwardly extending stub shaft portion, said stub shaft portion having a bore extending inwardly from an outer surface of said stub shaft portion;
    a generally spherical body with a first bore extending radially inward from a bottom surface of said spherical body, said first bore being adapted to receive said stub shaft portion of said support base, said spherical body having a second bore extending inward from an outer surface of said spherical body so as to be in communication with said first bore, said second bore being positioned to align itself with said bore of said stub shaft portion of said support base when said stub shaft portion is inserted into said first bore of said spherical body and said spherical body is rotated to angularly align said bore of said stub shaft portion and said second bore of said spherical body, said spherical body having an enlarged groove in said second bore;
    latch pin means adapted to be received in said bore of said stub shaft portion and said second bore of said spherical body for retention of said spherical body on said stub shaft portion when said stub shaft portion is positioned on said spherical body, said latch pin means being slidable between a locked position wherein said latch pin means is positioned in said bore of said stub shaft portion and said second bore of said spherical body and a released position wherein said latch pin means is removed from said bore of said stub shaft portion and extends beyond said outer surface of said spherical body; and
    radially expandable retention means movably mounted in said enlarged groove in said second bore of said spherical body for retaining at least a portion of said latch pin means in said spherical body when said latch pin means is in said released position.

2. The connector of claim 1 wherein said retention means includes means for retaining at least a portion of said latch pin means within said second bore of said spherical body when said latch pin means is in said locked position.

3. The connector of claim 1 wherein said retention means includes a radially expandable ring movably positioned by said spherical body along said second bore of said spherical body.

4. The connector of claim 3 wherein, said groove is configured to substantially accommodate said ring when said ring is radially expanded.

5. The connector of claim 4 wherein said latch pin means includes means for radially expanding said ring into said groove as said latch pin means is moved from said locked position to said released position.

6. The connector of claim 4 wherein said latch pin means includes means for radially expanding said ring into said groove as said latch pin means is moved from said released position to said locked position.

7. The connector of claim 1 wherein said latch pins means includes an elongated pin having first and second ends and a first and second recessed portion between said first and second ends of said pin, said first and second recessed portions cooperating with said first and second ends to define shoulder portions proximate said first and second ends, said retention means engaging said shoulder portions to prevent removal of said pin from said spherical body.

8. The connector of claim 7 wherein said pin is radially symmetrical about a central axis extending along the length of said pin, said pin including a generally cylindrical middle portion intermediate said first and second recessed portions.

9. The connector of claim 8 wherein each of said first and second recessed portions includes a frustoconical surface which reduces in diameter from said middle portion to said corresponding first and second end.

10. The connector of claim 1 wherein said latch pins means includes an elongated pin having first and second ends, each of said first and second ends including at least one "O" ring for providing a seal between said pin and an inner surface of said second bore of said spherical body.

11. The connector of claim 1 wherein said retention means includes a member movably positioned by said spherical body, said member movable between a retaining position wherein at least a portion of said member protrudes into said second bore of said spherical body to contactingly retain at least a portion of said latch pin means within said second bore and an unrestraining position wherein said member is substantially accommodated in a groove formed in said second body adjacent said second bore thereby allowing slidable movement of said latch pin means.

12. The connector of claim 11 wherein said latch pin means includes means for moving said member between said retaining position and said unrestraining position.

13. A ball hitch connector apparatus adapted for use with a conventional ball hitch socket, comprising;
    a support base including an upwardly extending stub shaft portion, said stub shaft portion having a bore extending inwardly from an outer surface of said stub shaft portion;
    a generally spherical body with a first bore extending radially inwardly from a bottom surface of said spherical body, said first bore being adapted to receive said stub shaft portion of said support base, said spherical body having a second bore extending inwardly from an outer surface of said spherical body so as to be in communication with said first bore, said second bore being positioned to align itself with said bore of said stub shaft portion of said support base when said stub shaft portion is inserted into said first bore of said spherical body and said spherical body is rotated to angularly align said bore of said stub shaft portion and said second bore of said spherical body, said spherical body having an enlarged groove in said second bore;

an elongated latch pin having first and second ends slidable between a locked position wherein said latch pin is positioned in said bore of said stub shaft portion and said second bore of said spherical body and a released position wherein said latch pin is removed from said bore of said stub shaft portion and extends beyond said outer surface of said spherical body, said latch pin having at least one recessed portion between said first and second ends of said latch pin, said recessed portion cooperating with at least one of said first and second ends to define a shoulder portion proximate said at least one of said first and second ends; and a radially expandable retaining member located in said enlarged groove in said second bore, at least a portion of said member projecting into said second bore of said spherical body to engage said shoulder when said recessed portion is disposed adjacent said groove, said latch pin including means for moving said retaining member into said groove as said latch pin is moved from said released position to said locked position, said groove being configured to substantially accommodate said member when said member is moved into said groove by said moving means.

* * * * *